(12) United States Patent
Lu

(10) Patent No.: US 11,237,329 B2
(45) Date of Patent: *Feb. 1, 2022

(54) METHODS FOR PROCESSING A MULTI-FIBER FERRULE USING A LASER

(71) Applicant: CommScope Technologies LLC, Hickory, NC (US)

(72) Inventor: Yu Lu, Eden Prairie, MN (US)

(73) Assignee: CommScope Technologies LLC, Hickory, NC (US)

( * ) Notice: Subject to any disclaimer, the term of this patent is extended or adjusted under 35 U.S.C. 154(b) by 268 days.

This patent is subject to a terminal disclaimer.

(21) Appl. No.: 16/519,414

(22) Filed: Jul. 23, 2019

(65) Prior Publication Data

US 2020/0018902 A1 Jan. 16, 2020

Related U.S. Application Data

(63) Continuation of application No. 14/831,518, filed on Aug. 20, 2015, now Pat. No. 10,401,568.

(60) Provisional application No. 62/039,701, filed on Aug. 20, 2014.

(51) Int. Cl.
*G02B 6/245* (2006.01)
*G02B 6/38* (2006.01)
*G02B 6/25* (2006.01)

(52) U.S. Cl.
CPC .............. *G02B 6/245* (2013.01); *G02B 6/25* (2013.01); *G02B 6/3863* (2013.01); *G02B 6/3865* (2013.01); *G02B 6/3885* (2013.01)

(58) Field of Classification Search
None
See application file for complete search history.

(56) References Cited

U.S. PATENT DOCUMENTS

| | | | |
|---|---|---|---|
| 4,510,005 | A | 4/1985 | Nijman |
| 5,317,661 | A | 5/1994 | Szentesi et al. |
| 6,106,368 | A | 8/2000 | Childers et al. |
| 6,288,362 | B1 | 9/2001 | Thomas et al. |
| 6,361,219 | B1 | 3/2002 | Blyler, Jr. et al. |
| 6,413,450 | B1 | 7/2002 | Mays, Jr. |
| 6,957,920 | B2 | 10/2005 | Luther et al. |
| 7,216,512 | B2 | 5/2007 | Danley et al. |
| 7,261,469 | B1 | 8/2007 | Dean, Jr. et al. |
| 8,340,485 | B2 | 12/2012 | Danley et al. |
| 8,740,474 | B2 | 6/2014 | Lu |
| 8,753,021 | B1 | 6/2014 | Baca et al. |
| 8,985,866 | B2 | 3/2015 | Danley et al. |

(Continued)

OTHER PUBLICATIONS

International Search Report and Written Opinion for Application No. PCT/US2015/046167 dated Nov. 26, 2015.

(Continued)

*Primary Examiner* — Lisa L Herring
(74) *Attorney, Agent, or Firm* — Merchant & Gould P.C.

(57) ABSTRACT

A method for processing ferrules for fiber optic connectors is disclosed herein. The method involves ablating a distal end face of the ferrule with the plurality of laser beam pulses to remove a distal layer of the ferrule without removing an optical fiber secured within the ferrule. By removing the distal layer from the ferrule, the optical fiber is caused to protrude distally outwardly from the distal end of the ferrule by a desired amount. A final polish is applied to the distal end face of the ferrule. In some examples, a subsequent laser step is used to remove portions of the distal end face of the ferrule.

20 Claims, 16 Drawing Sheets

(56) References Cited

U.S. PATENT DOCUMENTS

| | | |
|---|---|---|
| 10,401,568 B2 | 9/2019 | Lu |
| 2002/0088780 A1 | 7/2002 | Boyle et al. |
| 2003/0097745 A1 | 5/2003 | Okamoto |
| 2004/0086235 A1 | 5/2004 | Natori et al. |
| 2005/0036742 A1 | 2/2005 | Dean, Jr. et al. |
| 2005/0180702 A1 | 8/2005 | Kevern et al. |
| 2005/0232564 A1 | 10/2005 | Jones et al. |
| 2006/0072879 A1 | 4/2006 | Yang et al. |
| 2006/0137403 A1 | 6/2006 | Barr et al. |
| 2009/0041412 A1 | 2/2009 | Danley et al. |
| 2010/0129031 A1 | 5/2010 | Danley et al. |
| 2010/0215319 A1 | 8/2010 | Childers et al. |
| 2010/0303416 A1 | 12/2010 | Danley et al. |
| 2010/0303419 A1 | 12/2010 | Benjamin et al. |
| 2012/0080414 A1 | 4/2012 | Zhang et al. |
| 2012/0093465 A1 | 4/2012 | Danley et al. |
| 2012/0145307 A1 | 6/2012 | Margolin et al. |
| 2012/0263422 A1 | 10/2012 | Lu |
| 2014/0105547 A1 | 4/2014 | Baca et al. |
| 2015/0030291 A1 | 1/2015 | Webb et al. |

OTHER PUBLICATIONS

Ohtsuka et al., "Non-Fixed Fiber-Portion-Compressed Type Multi-Fiber PC Optical Connector," Jul. 1998.
International Search Report and Written Opinion for Application No. PCT/US2012/033306 dated Oct. 31, 2012.
G3 RM/HS Series 10-20W Pulsed Fiber Lasers With GTWave™ and PulseTune Technology, SPI Lasers LLC, spilasers.com, 2010.
Extended European Search Report for Application No. 15833864.0 dated Apr. 6, 2018.

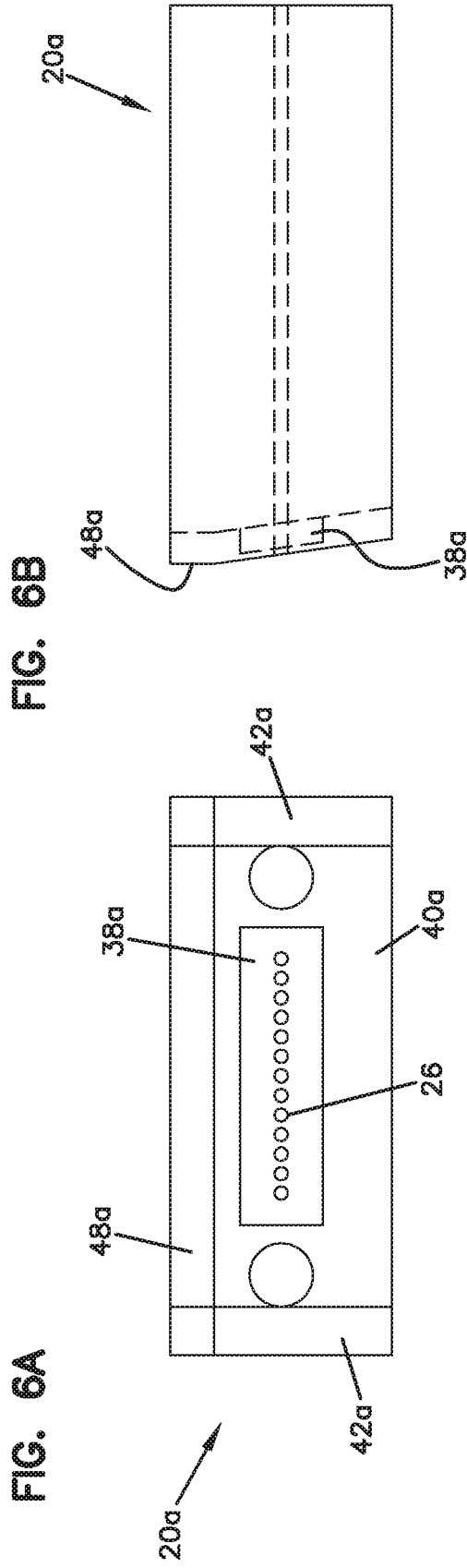
FIG. 6A
FIG. 6B
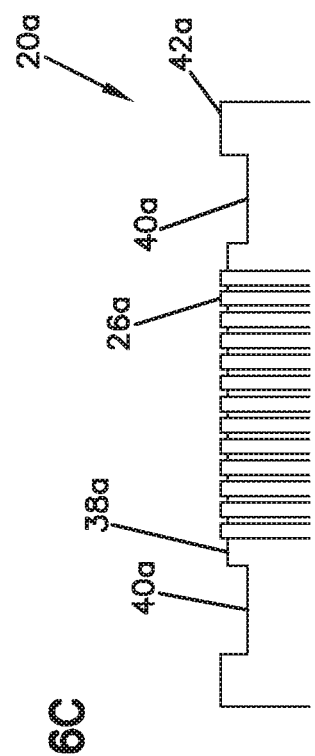
FIG. 6C

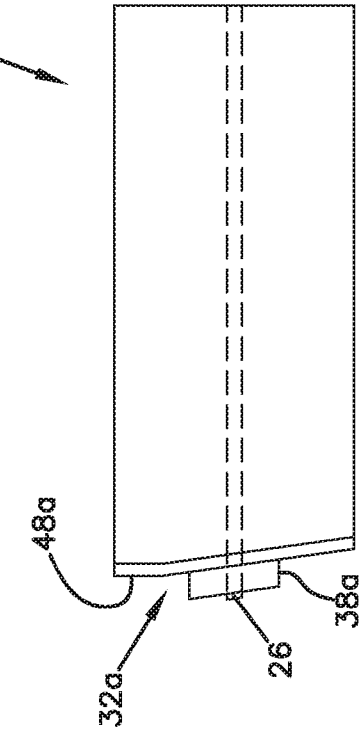
FIG. 7B
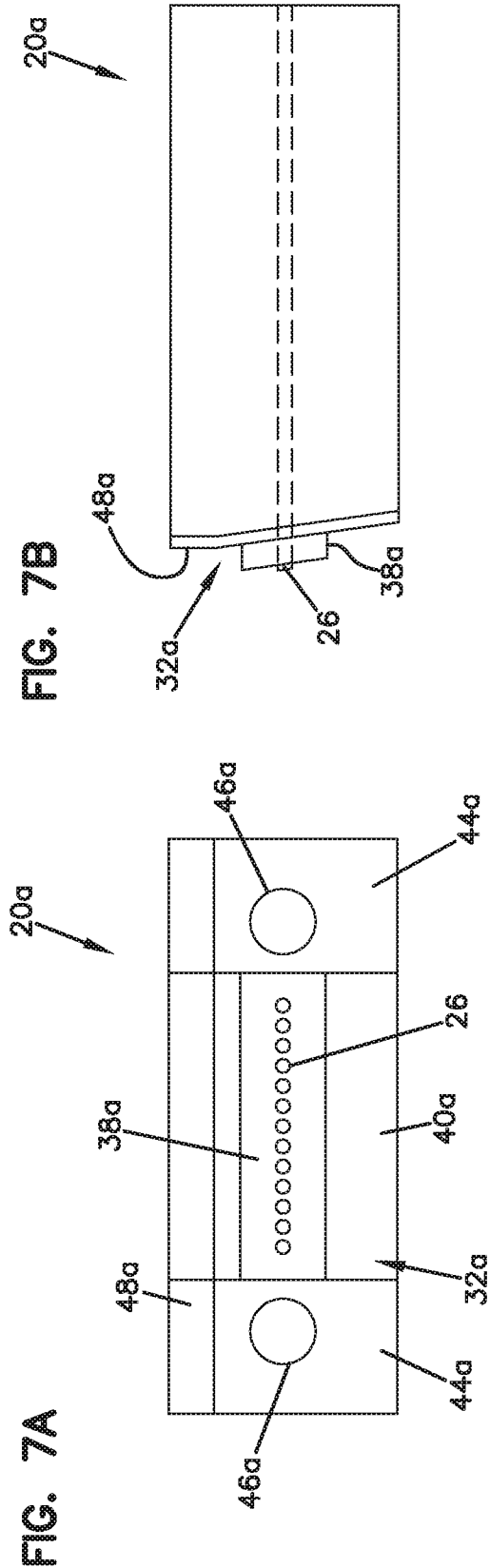
FIG. 7A
FIG. 7C

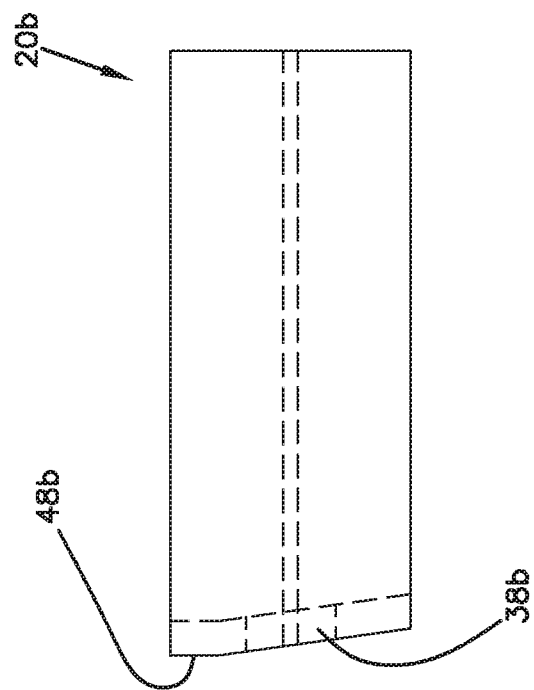
FIG. 8B
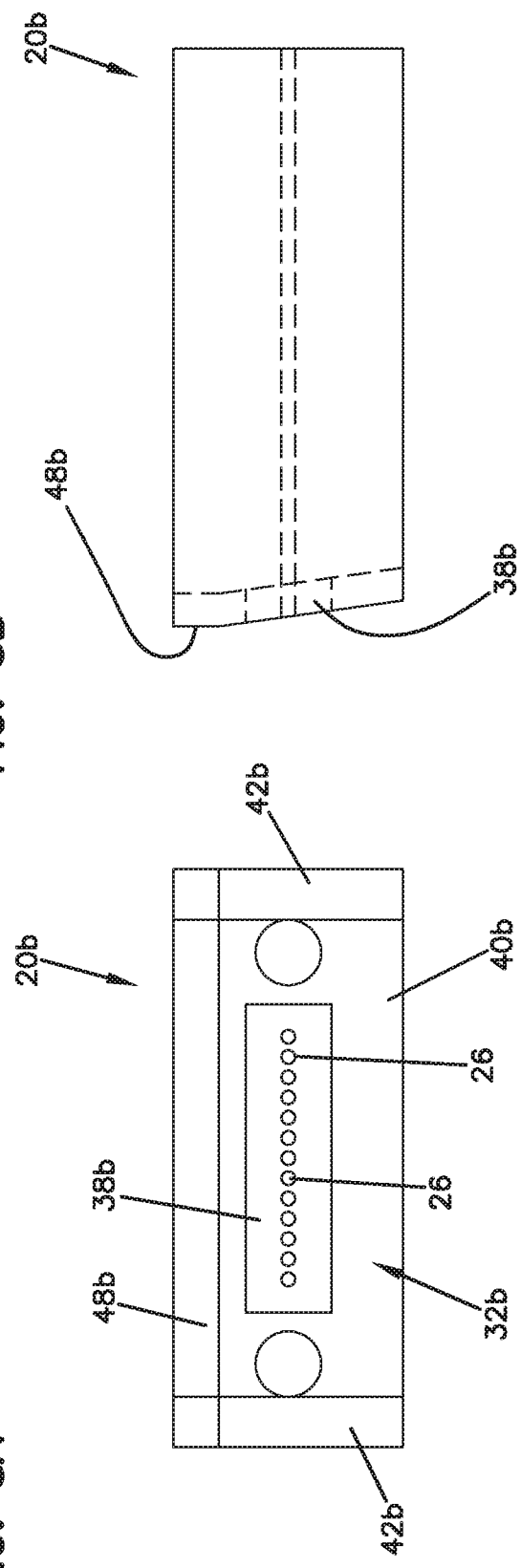
FIG. 8A
FIG. 8C

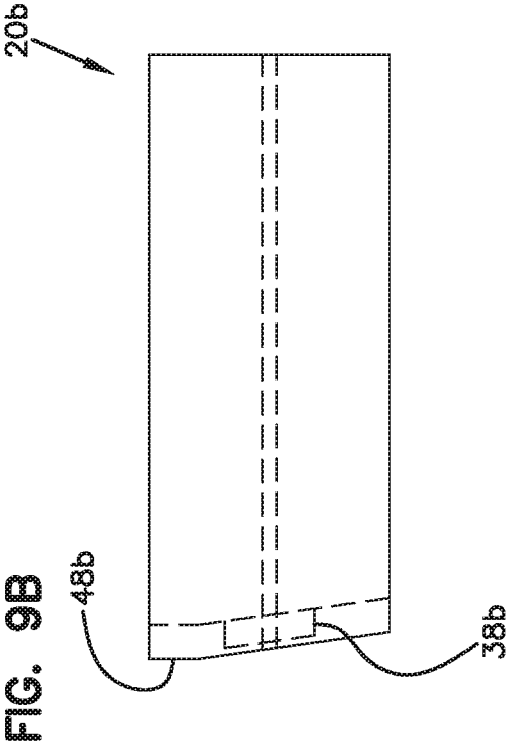
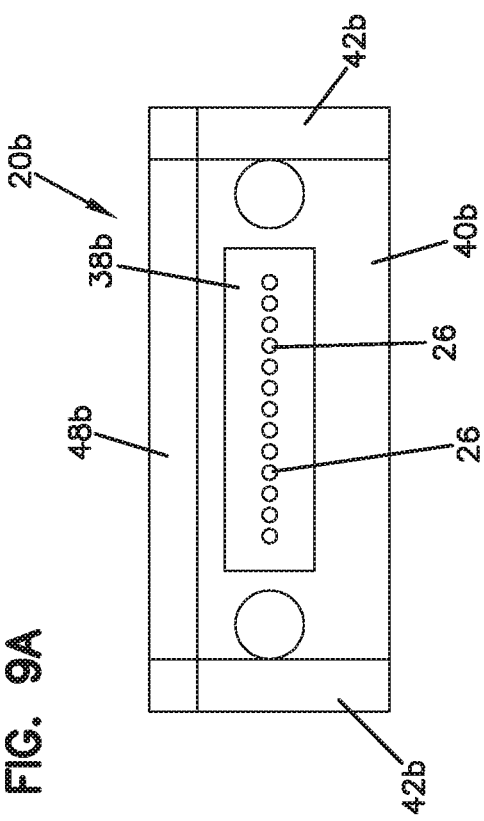
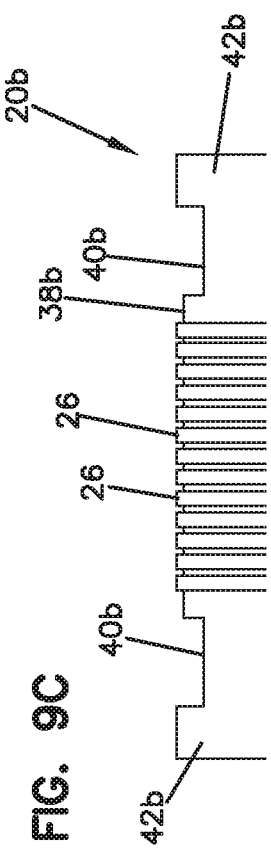

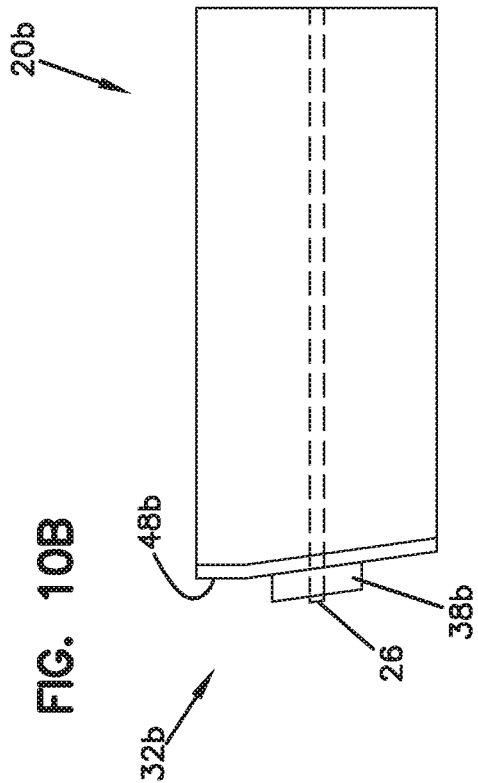
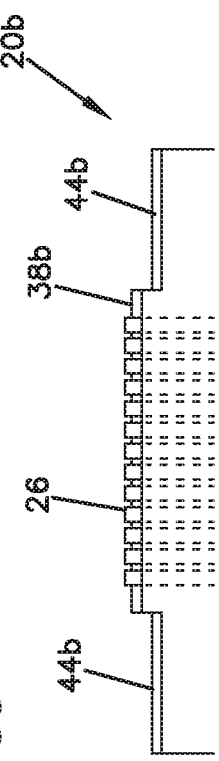
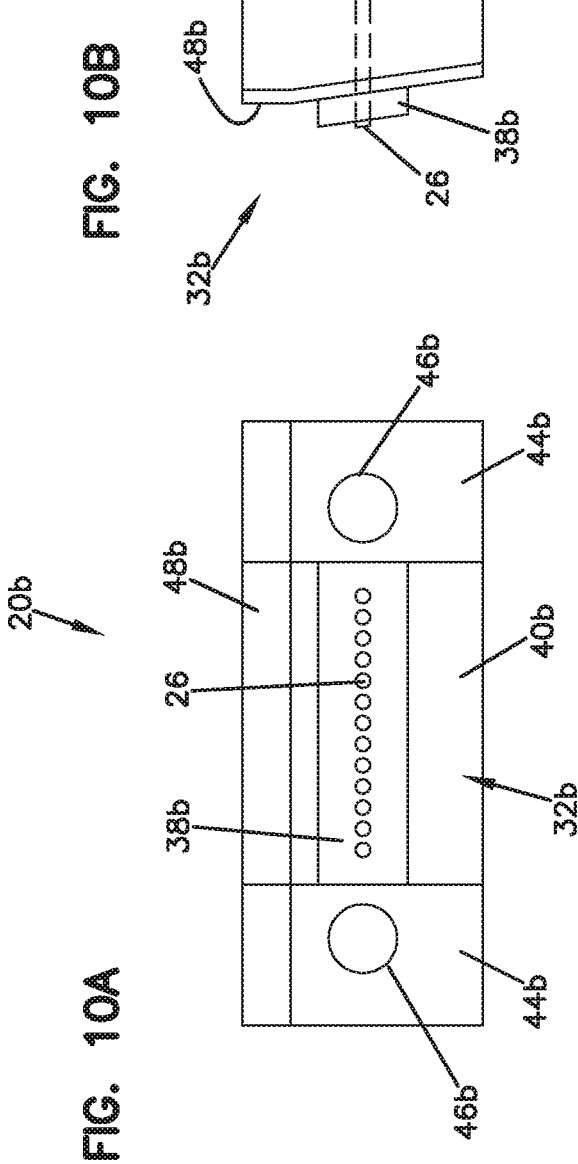

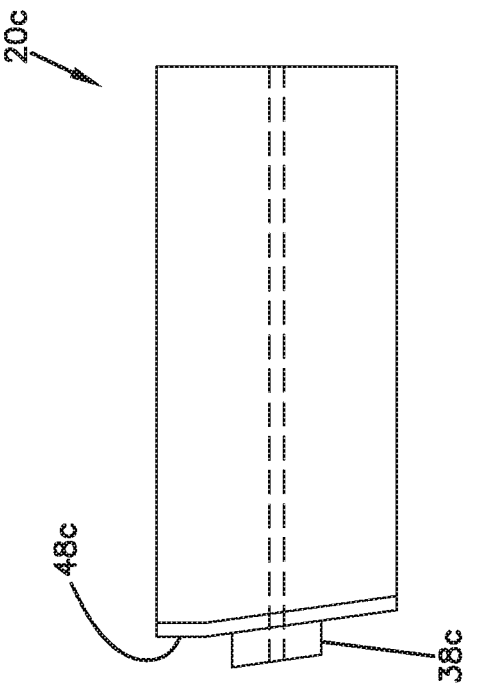
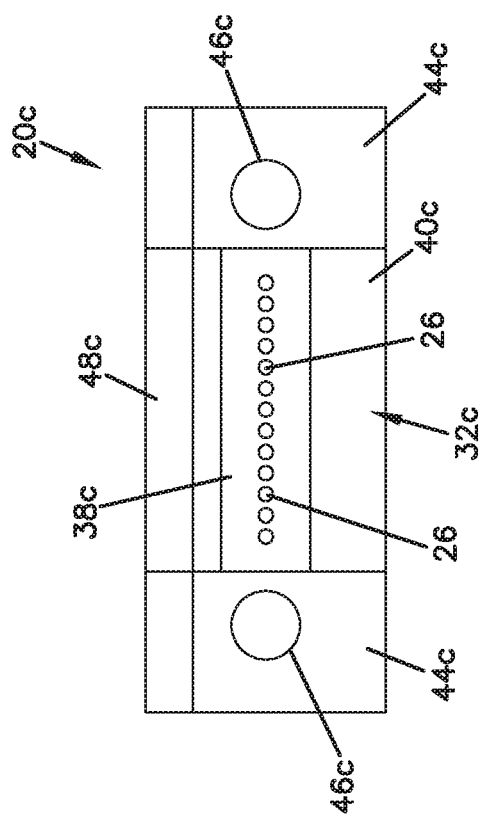
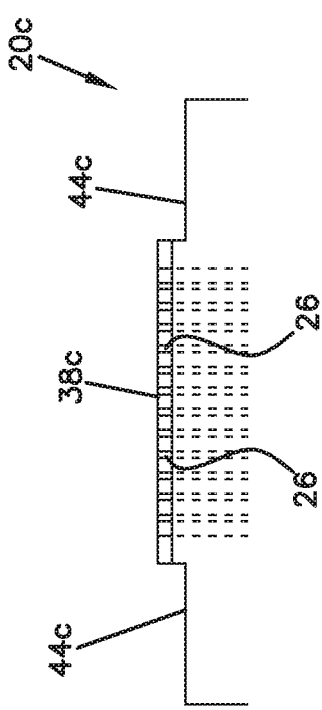

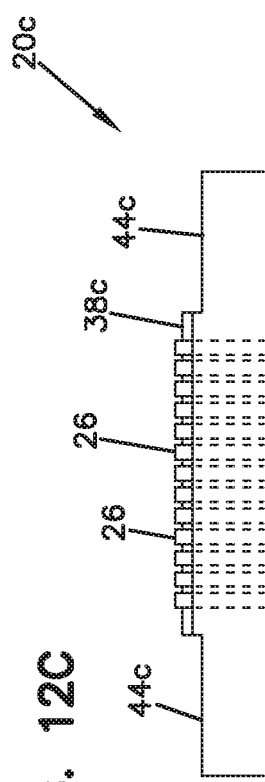
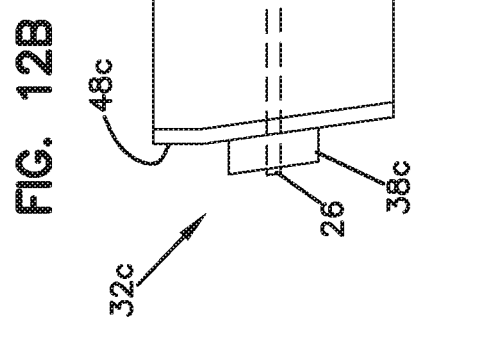
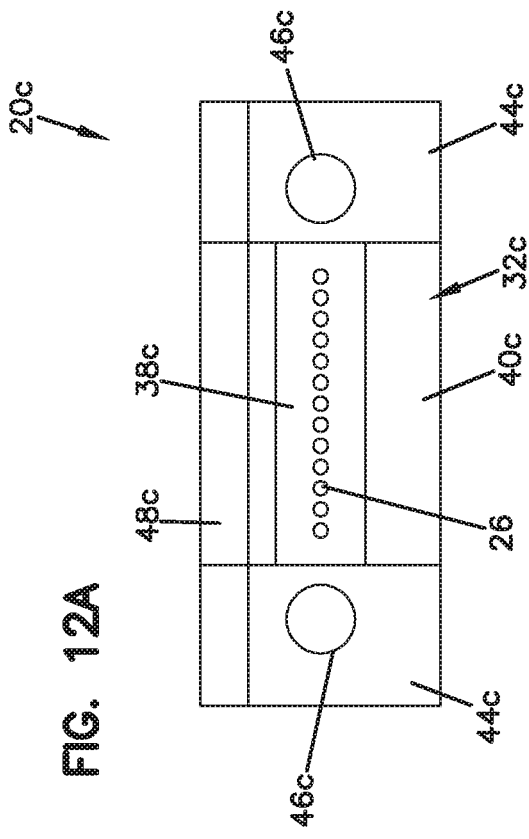

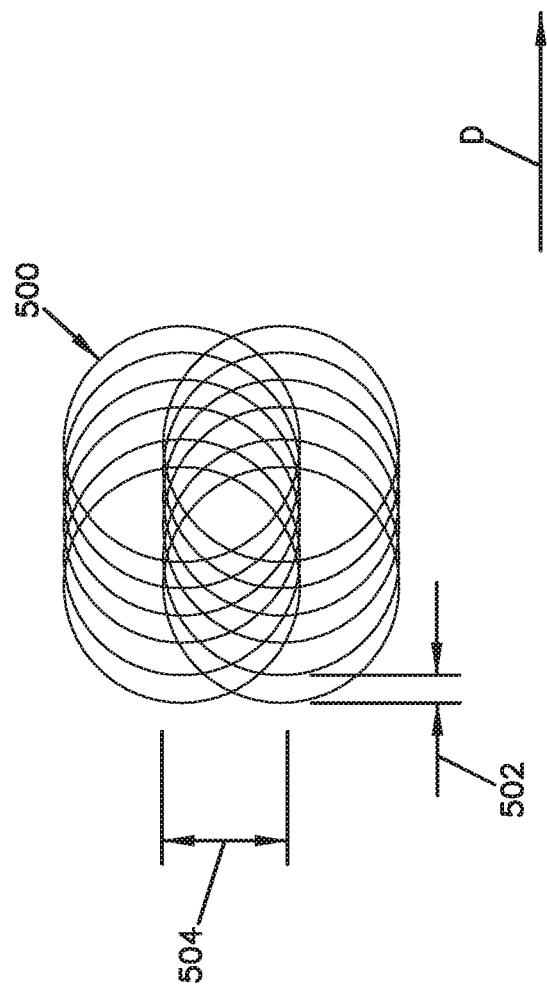

METHODS FOR PROCESSING A MULTI-FIBER FERRULE USING A LASER

CROSS REFERENCE TO RELATED APPLICATIONS

This application is a continuation of U.S. patent application Ser. No. 14/831,518, filed Aug. 20, 2015, now U.S. Pat. No. 10,401,568; which claims the benefit of U.S. Provisional Patent Application No. 62/039,701, filed Aug. 20, 2014, which applications are hereby incorporated by reference in their entireties.

TECHNICAL FIELD

The present disclosure relates generally to methods for processing components of fiber optic connectors. More particularly, the present disclosure relates to methods for processing multi-fiber ferrules used in multi-fiber fiber optic connectors.

BACKGROUND

Fiber optic communication systems are becoming prevalent in part because service providers want to deliver high band width communication capabilities (e.g., data and voice) to customers. Fiber optic communication systems employ a network of fiber optic cables to transmit large volumes of data and voice signals over relatively long distances. Fiber optic connectors are an important part of most fiber optic communication systems. Fiber optic connectors allow optical fibers to be quickly optically connected without requiring a splice. Fiber optic connectors can include single fiber connectors and multi-fiber connectors.

A typical multi-fiber fiber optic connector includes a ferrule assembly supported at a distal end of a connector housing. The ferrule assembly can include a multi-fiber ferrule mounted in a hub. A spring is used to bias the ferrule assembly in a distal direction relative to the connector housing. The multi-fiber ferrule functions to support the end portions of multiple optical fibers. The multi-fiber ferrule has a distal end face at which polished ends of the optical fibers are located. When two multi-fiber fiber optic connectors are interconnected, the distal end faces of the multi-fiber ferrules oppose and are biased toward one another by their respective springs. With the multi-fiber fiber optic connectors connected, their respective optical fibers are coaxially aligned such that the end faces of the optical fibers directly oppose one another. In this way, optical signals can be transmitted from optical fiber to optical fiber through the aligned end faces of the optical fibers.

As indicated above, multi-fiber ferrules are configured for supporting the ends of multiple optical fibers. Typically, the optical fibers are arranged in one or more rows within the multi-fiber ferrule. When two multi-fiber ferrules are interconnected, the fibers of the rows of optical fibers align with one another. For most multi-fiber ferrules, it is desirable for the optical fibers to protrude distally outwardly from the distal end faces of the multi-fiber ferrules. This type of protrusion can assist in making physical fiber-to-fiber contact when two multi-fiber connectors are mated. U.S. Pat. No. 6,957,920, which is hereby incorporated by reference in its entirety, discloses a multi-fiber ferrule having protruding optical fibers of the type described above.

Currently, multi-fiber ferrules are made of a material that is softer than the material of the optical fibers. The difference in hardness between the multi-fiber ferrule and its corresponding optical fibers allows polishing processes to be used for generating optical fiber protrusions. Specifically, slurry or flock films are used to simultaneously polish both the end face of the ferrule and the corresponding optical fibers supported by the ferrule. Because the material composition of the ferrule is softer than the material composition of the optical fibers, the ferrule material is removed at a faster rate than the optical fiber material thereby causing the optical fibers to protrude from the end face of the ferrule after the polishing process. U.S. Pat. No. 6,106,368 discloses a flock film based polishing process of the type described, which is hereby incorporated by reference in its entirety.

Generating optical fiber protrusions via the methods described above can present a number of issues. First, the processes can be time consuming and require the use of relatively expensive consumables. Furthermore, polishing processes generate considerable residue and require substantial cleaning operations. Moreover, while the processes described above provide can be used to increase the optical fiber height at the end face of a ferrule, other end face geometries of the optical fiber (e.g., tilt angle and radius) are also impacted.

SUMMARY

The present disclosure relates generally to a process for causing an optical fiber to protrude outwardly from the end face of a ferrule. In one example, a laser is used to remove portions of the ferrule so as to expose a protruding portion of an optical fiber held within the ferrule. In certain examples, characteristics of the laser (focal spot intensity, interaction time, wavelength, pulse length) are selected so that the laser effectively removes the material of the ferrule without ablating the optical fiber held within the ferrule. Thus, when the appropriate laser source is selected the laser may be transparent to the fiber glass material. This transparency allows the ferrule material to be removed without affecting the fiber glass material. As such, it is not necessary to mask the fiber prior to scanning the end face of the ferrule.

The laser can be used in a micro-machining process in which short pulsing of the laser removes material at the end face of the ferrule at the micron level. By selecting suitable the laser wavelength, power density and pulse properties, it is possible for the laser to remove the ferrule material to a controlled depth, while leaving the optical fiber intact. In this way, an optical fiber protrusion above the ferrule end face is provided by removing a layer of ferrule material using a laser. In other examples, a final polishing step can be used to smooth the ferrule end face. This may result in rounding off sharp corners on the fiber and smoothing the ferrule surface from laser ablation. Other aspects of the present disclosure relates to utilizing short pulsing of a laser to shape a ferrule.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 6A is an end view of the ferrule after having been processed according to a third step of the method of FIG. 17;

FIG. 6B is a side view of the ferrule of FIG. 6A;

FIG. 6C is a bottom view of the ferrule of FIG. 6A;

FIG. 7A is an end view of the ferrule after having been processed according to a fifth step of the method of FIG. 17;

FIG. 7B is a side view of the ferrule of FIG. 7A;

FIG. 7C is a bottom view of the ferrule of FIG. 7A;

FIG. 8A is an end view of an example pre-mold multi-fiber ferrule processed with a method in accordance with the principles of the present disclosure;

FIG. 8B is a side view of the ferrule of FIG. 8A;

FIG. 8C is a bottom view of the ferrule of FIG. 8A;

FIG. 9A is an end view of the ferrule after having been processed according to a fourth step of the method of FIG. 16;

FIG. 9B is a side view of the ferrule of FIG. 9A;

FIG. 9C is a bottom view of the ferrule of FIG. 9A;

FIG. 10A is an end view of the ferrule after having been processed according to a sixth step of the method of FIG. 16;

FIG. 10B is a side view of the ferrule of FIG. 10A;

FIG. 10C is a bottom view of the ferrule of FIG. 10A;

FIG. 11A is an end view of yet another example pre-mold multi-fiber ferrule processed with a method in accordance with the principles of the present disclosure;

FIG. 11B is a side view of the ferrule of FIG. 11A;

FIG. 11C is a bottom view of the ferrule of FIG. 11A;

FIG. 12A is an end view of the ferrule after having been processed according to a fourth step of the method of FIG. 15;

FIG. 12B is a side view of the ferrule of FIG. 12A;

FIG. 12C is a bottom view of the ferrule of FIG. 12A;

FIG. 19 is an example laser pulsed operation showing overlapping configurations in accordance with principles of the present disclosure.

DETAILED DESCRIPTION

Figure 1:
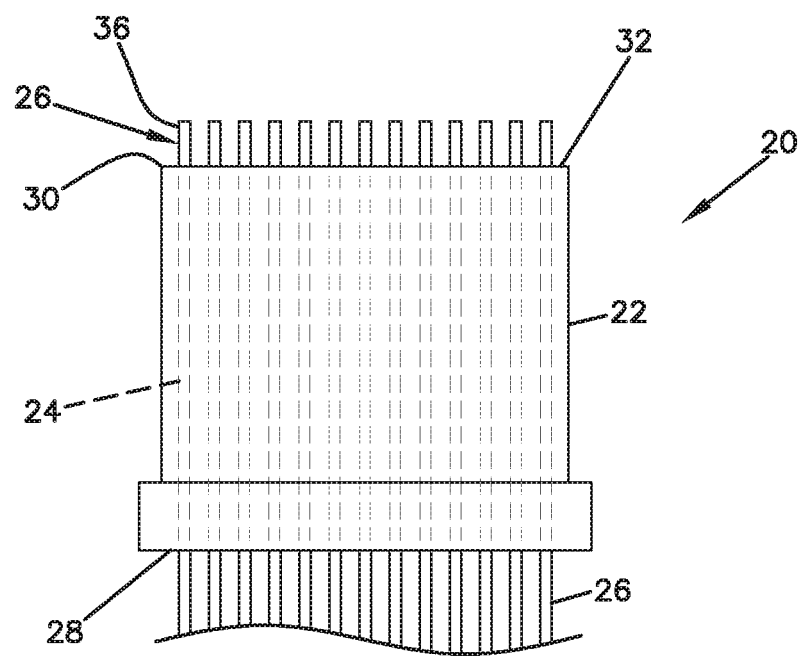
FIG. 1 is a side view of a multi-fiber ferrule in accordance with the principles of the present disclosure.

FIG. 1 illustrates an example ferrule 20 in accordance with the principles of the present disclosure. The ferrule 20 has a ferrule body 22 defining a plurality of parallel openings 24 for receiving optical fibers 26. The openings 24 extend through the ferrule body 22 from a proximal end 28 of the ferrule body 22 to a distal end 30 of the ferrule body 22. In certain embodiments, the openings 24 are parallel with respect to alignment pins (not shown) mounted within the ferrule body 22 or pin receiving openings (not shown) defined within the ferrule body 22. The distal end 30 of the ferrule body 22 defines a distal end face 32 that faces in a distal direction.

Figure 2:
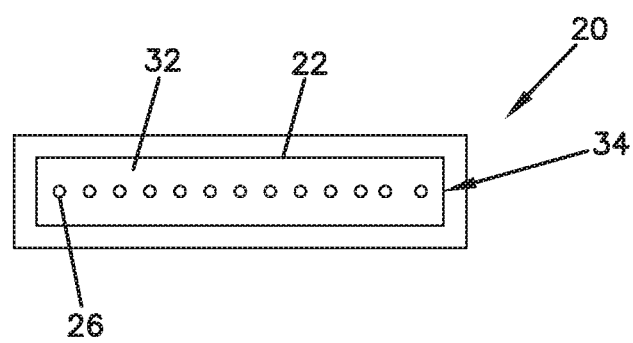
FIG. 2 is an end view of the ferrule of FIG. 1.

Referring to FIG. 2, the openings 24 defined through the ferrule body 22 are shown aligned along a row 34. As depicted, the plurality of openings 24 includes 12 separate openings. Of course, in other examples, different numbers of openings can be provided. Additionally, in further examples, multiple rows of openings may be provided.

The optical fibers 26 can be potted within the openings 24 of the ferrule body 22. In one example, the optical fibers 26 are potted within the openings 24 by bonding the optical fibers within the openings 24 using an adhesive such as epoxy. As shown at FIGS. 1 and 2, the optical fibers 26 are potted within the ferrule body 22 with stub ends 36 of the optical fibers 26 projecting distally beyond the distal end face 32 of the ferrule body 22.

Figure 3:
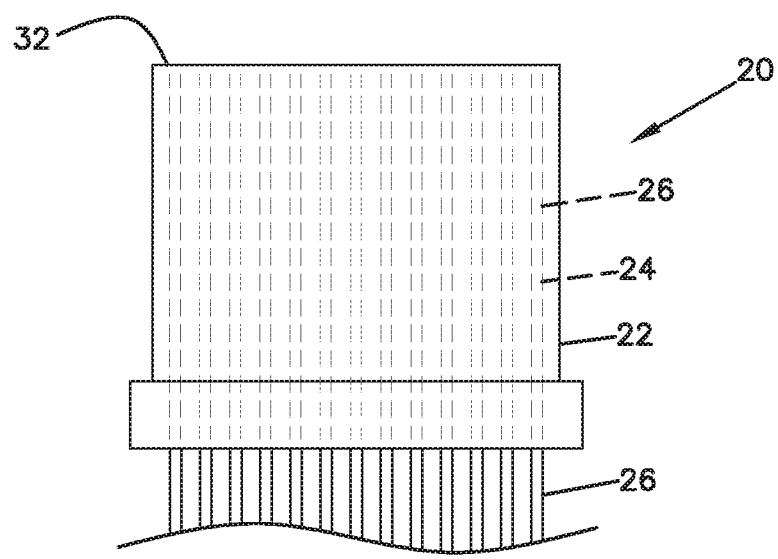
FIG. 3 is a side view of the ferrule after having been processed according to a second step of the method of FIG. 10.

The fiber stubs can be removed by, for example, a cleaving process. The distal end faces 32 of the optical fibers 26 can be polished until the distal end faces 32 of the optical fibers 26 are even (i.e., flush) with the distal end face 32 of the ferrule body 22 as shown at FIG. 3. It will be appreciated that an angled polish or a non-angled polish can be used. For example, in the case of single mode optical fibers, the end face 32 of the ferrule 20 and end faces of the optical fibers 26 can be polished such that the end faces are aligned along a plane angled eight degrees relative to a plane perpendicular to the central axes of the optical fibers 26. In the case of multi-mode optical fibers, the distal end face of the ferrule 20 as well as the distal end faces of the optical fibers can be polished to a plane that is zero degrees relative to the plane that is perpendicular to the longitudinal axes of the optical fibers.

Figure 4:
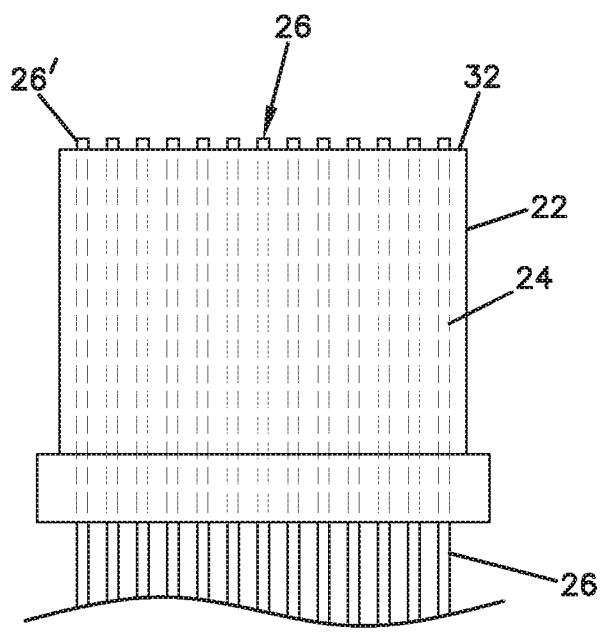
FIG. 4 is a side view of the ferrule after having been processed according to a third step of the method of FIG. 10.

Referring to FIG. 4, a laser can be used to remove a distal layer of the ferrule body 22 from the distal end face 32 of the ferrule body 22 without removing the end portions of the optical fibers 26. Thus, fiber protrusions 26' can be created that project distally beyond the distal end face 32 of the ferrule 20. In one example, the laser can be scanned across the distal end face 32 of the ferrule body 22 to remove material from the ferrule body 22 at the micron level. In certain examples, at least one micron of material is removed from the distal end face 32 of the ferrule 20 such that the optical fibers 26 project at least one micron outwardly from the end face 32 of the ferrule body 22. In other examples, at least two or three microns of material are removed from the distal end face 32 of the ferrule body 22 such that the optical fibers 26 protrude at least two or three microns beyond the distal end face 32 of the ferrule body 22. In still other examples, a layer having a depth/thickness of at least five, ten or fifteen microns is removed from the distal end of the ferrule body 22 such that the optical fibers 26 protrude at least five, ten or fifteen microns distally beyond the resultant distal end face 32 of the ferrule body 22.

Methods for processing multi-fiber ferrules can vary. Examples of various methods for processing ferrules once they have been potted with optical fibers will be described below. It will be appreciated that other methods may be used in accordance with the present disclosure.

Figure 5A:
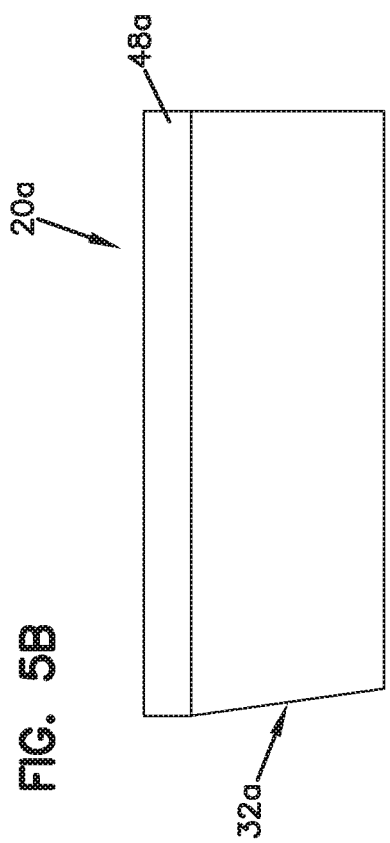
FIG. 5A is an end view of an example multi-fiber ferrule processed with a method in accordance with the principles of the present disclosure.
Figure 5B:
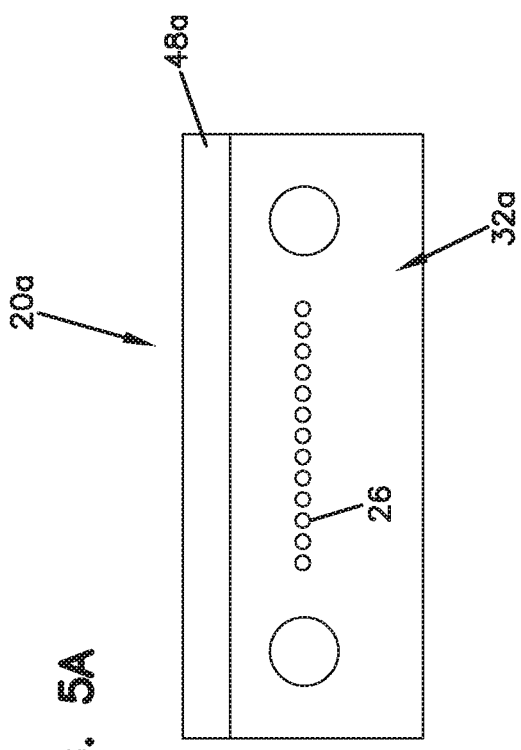
FIG. 5B is a side view of the ferrule of FIG. 5A.
Figure 5C:
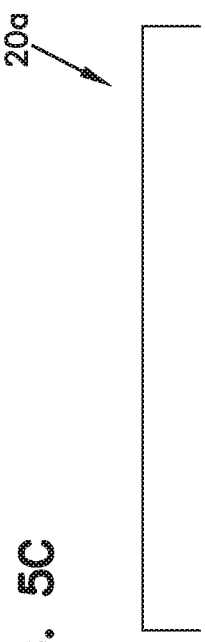
FIG. 5C is a bottom view of the ferrule of FIG. 5A.

One method is shown beginning with FIGS. 5A-5C. A first step of the method for processing a ferrule 20a can include polishing distal end faces of the optical fibers 26 until the distal end faces of the optical fibers 26 are even (i.e., flush) with the distal end face 32a of the ferrule 20a. In this example, the distal end face 32a of the ferrule 20a can be aligned along a plane angled eight degrees relative to a plane perpendicular to the central axes of the optical fibers 26. The ferrule 20a can include a flat region 48a that is zero degrees relative to the plane that is perpendicular to the longitudinal axes of the optical fibers 26.

Referring to FIGS. 6A-6C, a second step of the method can include using a laser having a first power to remove a layer in a middle section 38a (e.g., region of interest) of the ferrule surface around the optical fibers 26 to achieve a certain protrusion length. In certain examples, the middle section 38a can be about 3.4 millimeters (mm) wide and about 1.3 mm in height. It will be appreciated that the width and height of the middle section 38a may vary in other examples. The laser can be set with a different laser ablating intensity than the first to ablate the outer region 40a surrounding the middle section 38a. The laser is scanned across the distal end face 32a of the ferrule 20a at an eight degree angle to remove material at the micron level. As shown, edges 42a are not exposed to the laser. The edges 42a can be described as a high point area to support the ferrule 20a to help prevent the ferrule 20a from tilting during processing.

In one example, the outer region 40a can be recessed lower than the middle section 38 and the optical fiber 26 as shown in FIG. 6C. In other examples, the outer region 40a can be even (i.e., flush) with the middle section 38a without interference with the optical fiber 26. In certain examples, the middle section 38a is the only portion that protrudes out over the entire face of the ferrule 20a thereby making the ferrule 20a less sensitive to contamination which can result in better connectivity.

In some examples, after the laser has been used to remove the desired thickness of material from both the middle section 38a and the outer region 40a, a subsequent polishing step can be applied. In this step, a final polish is applied using flock film, for example, to adjust/control the protrusion heights of the optical fibers 26. The final polish can also be used to smooth the ferrule surface from laser ablation. In other examples, the final polish can be used to alter the geometries of the end faces of the optical fibers 26. For example, polishing with flock film can help round the corners of the optical fibers 26.

Following the final polishing step, a final laser step can be used to remove the edges 42a as shown in FIGS. 7A-7C. For example, a laser can be used to ablate the distal end face 32a of the ferrule 20a from the edges 42a across to the middle section 38a to take off the edges 42a and any material around guide-pin holes 46a (e.g., cutting hole area). Again, the laser can follow the same eight degree angled profile of the distal end face 32a. A recess region 44a may be formed around the guide-pin holes 46a such that the guide-pin holes 46a are less sensitive to debris. Less contamination on the distal end face 32a of the ferrule 20a may enhance the connection or physical contact of the optical fiber 26.

In other examples, the laser can be used to ablate at once the outer region 40a surrounding the middle section 38a to the edges 42a of the ferrule 20a to create the recess 44a around the guide-pin holes 46a. In this example, the final polishing step would follow the laser ablating step. Thus, the method would not include a subsequent laser step to remove the edges 42a.

Another example method for processing a ferrule 20b is shown beginning with FIGS. 8A-8C. In this example, the ferrule 20b is pre-molded such that the middle section 38b and the outer region 40b are already configured similarly to FIGS. 6A-6C described above. This design reduces the number of steps in the laser process. The outer region 40b can be recessed slightly compared to the middle section 38b. The distal end face 32b of the ferrule 20b can be aligned along a plane angled eight degrees relative to a plane perpendicular to the central axes of the optical fibers 26. The ferrule 20b can include a flat region 48b that is zero degrees relative to the plane that is perpendicular to the longitudinal axes of the optical fibers 26.

The middle section 38b can be raised in the pre-mold with the edges 42b being even with the middle section 38b. The edges 42b are raised to provide support for the ferrule 20b and to help better control the ferrule 20b during processing. An initial polishing step is applied to the distal end face 32b of the ferrule 20b until the distal end faces of the optical fibers 26 are even (i.e., flush) with the distal end face 32b of a ferrule 20b as shown at FIGS. 8A-8C.

The pre-mold ferrule 20b does not show the optical fibers 26 protruding from the distal end face 32b. In this example, a laser can be used to ablate only the middle section 38b to achieve a certain protrusion length as shown in FIGS. 9A-9C. A final polishing step can follow the laser removal of material from the middle section 38b. As described above, the final polish is applied using flock film. The final polish can also be used to smooth the ferrule surface from laser ablation. In other examples, the final polish can be used to round the corners of the optical fibers 26.

Following the final polishing step, a final laser step can be used to remove the edges 42b as shown in FIGS. 10A-10C. A laser can be used to ablate the distal end face 32b of the ferrule 20b from the edges 42b across to the middle section 38b to take off the edges 42b and any material around guide-pin holes 46b (e.g., cutting hole area). Again, the laser can follow the same eight degree angled profile of the distal end face 32b. A recess region 44b may be formed around the guide-pin holes 46b such that the guide-pin holes 46b are less sensitive to debris. Less contamination on the distal end face 32b of the ferrule 20b may enhance the connection or physical contact of the optical fiber 26.

Another example method for processing a ferrule 20c is shown beginning with FIGS. 11A-11C. In this example, the ferrule 20c is pre-molded such that the middle section 38c and the outer region 40c are already configured similarly to FIGS. 10A-10C such that the outer region 40c and recess 44c are already formed in the ferrule 20c mold. The middle section 38c can already be raised in the pre-mold. This design further reduces the number of steps in the laser process. The outer region 40c can be recessed slightly compared to the middle section 38c. As shown, there are no edges to support the ferrule 20c. The distal end face 32c of the ferrule 20c can be aligned along a plane angled eight degrees relative to a plane perpendicular to the central axes of the optical fibers 26. The ferrule 20c can include a flat region 48c that is zero degrees relative to the plane that is perpendicular to the longitudinal axes of the optical fibers 26.

An initial polishing step is applied to the distal end face 32c of the ferrule 20c until the distal end faces of the optical fibers 26 are even (i.e., flush) with the distal end face 32c of a ferrule 20c as shown at FIGS. 11A-11C.

The pre-mold ferrule 20c does not show the optical fibers 26 protruding from the distal end face 32c. In this example, a laser can be used to ablate only the middle section 38c to achieve a certain protrusion length as shown in FIGS. 12A-12C.

A final polishing step can follow the laser removal of material from the middle section 38c. As described above, the final polish is applied using flock film. The final polish can also be used to smooth the ferrule surface from laser ablation. In other examples, the final polish can be used to round the corners of the optical fibers 26. No subsequent laser step is needed because the recess 44c has already been made around the guide-pin holes 46c and there are no edges to cut off.

In certain embodiments, a polishing process can be used to round or dome the distal end faces of the optical fibers to a desired radius. Additionally, the laser can also be used to form additional structures within the ferrule body.

Figure 13:
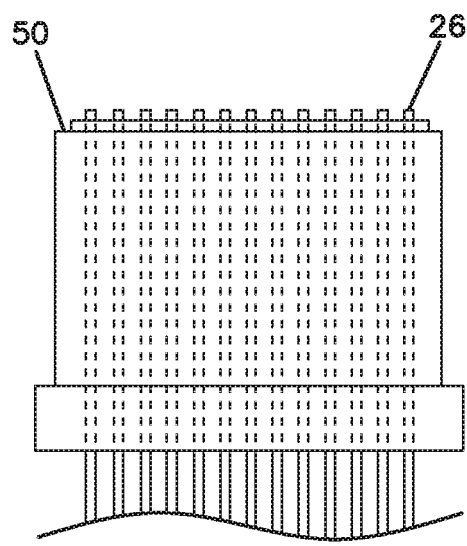
FIG. 13 is a side view of another multi-fiber ferrule processed with a method in accordance with the principles of the present disclosure.
Figure 14:
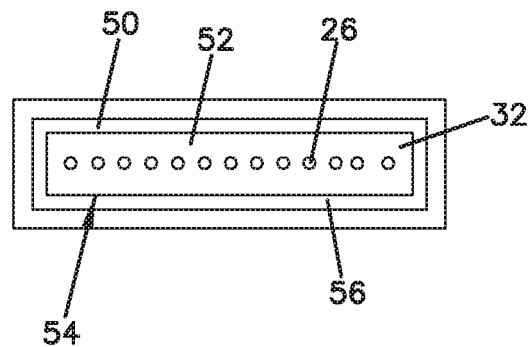
FIG. 14 is an end view of the multi-fiber ferrule of FIG. 13.

Referring to FIGS. 13 and 14, the laser can be used to ablate a peripheral portion 50 of the distal end face 32 that surrounds a central region 52 of the end face 32 through which the optical fibers 26 extend. In this way, a center platform 54 surrounded by a recessed region 56 is provided at the end face of the ferrule body. An example patent showing a multi-fiber ferrule having a distal end face with peripheral portions of the end face recessed relative to a central portion of the end face is shown in United States Patent Application Publication No. US2005/0180702, which is hereby incorporated by reference in its entirety.

Figure 15:
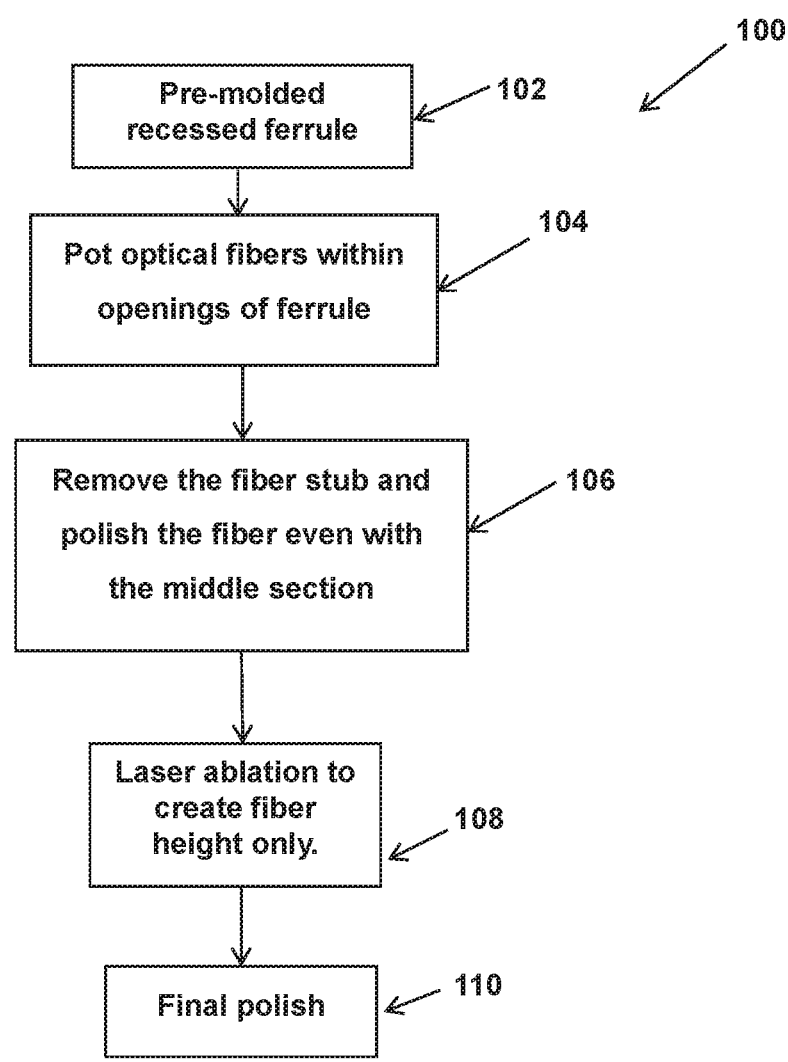
FIG. 15 is a flow chart illustrating a method for processing a multi-fiber ferrule in accordance with the principles of the present disclosure.

Referring to FIG. 15, a flow chart is illustrated showing an example method 100 for processing the multi-fiber ferrule 20. In this example, the method 100 includes operations, 102, 104, 106, 108, and 110.

The operation 102 provides for a pre-molded recessed ferrule 20. The pre-molded ferrule 20 already has the middle section 38 raised and a recessed surface around the guide pin holes 46. There are no edges 42 or support surfaces in this example. Examples of this operation can be seen in FIGS. 11A-11C.

Operation 104 is performed to pot the optical fibers 26 within the openings 24 of the pre-molded ferrule body 22. In one example, the optical fibers 26 are potted within the openings 24 by bonding the optical fibers using adhesive such as epoxy. Examples of the optical fibers 26 and the ferrule body 22 are shown and described with reference to FIGS. 1 and 2.

The operation 106 is performed to remove the fiber stubs and perform an initial polish to the distal end faces of the optical fibers 26 until they are even (e.g., flush) with the middle section 38. An example of this process can be seen in FIG. 3.

The operation 108 is performed to remove a layer of the middle section 38 of the ferrule 20 using a laser to create the fiber height or protrusion. Examples of this operation can be seen in FIGS. 12A-12C.

The operation 110 includes a final polish.

Figure 16:
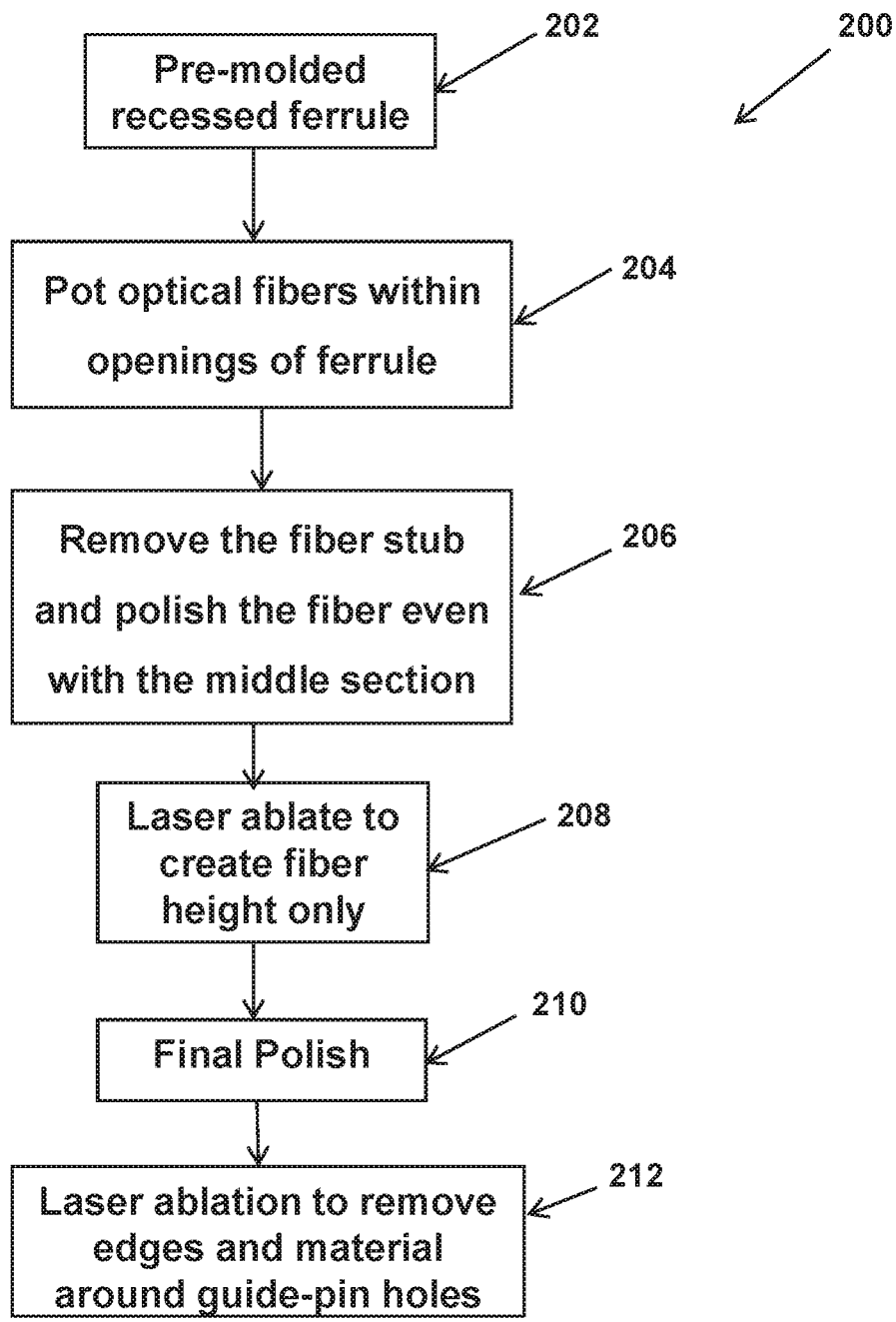
FIG. 16 is a flow chart illustrating another method for processing a multi-fiber ferrule in accordance with the principles of the present disclosure.

Referring to FIG. 16, a flow chart is illustrated showing an example method 200 for processing the multi-fiber ferrule 20. In this example, the method 200 includes operations, 202, 204, 206, 208, 210, and 212.

The operation 202 provides for a pre-molded recessed ferrule 20. The pre-molded ferrule 20 already has the middle section 38 raised and a recessed surface around the guide-pin holes 46. Edges 42 or support surfaces are raised equal to the middle section 38. Examples of this operation can be seen in FIGS. 8A-8C.

Operation 204 is performed to pot the optical fibers 26 within the openings 24 of the pre-molded ferrule body 22. In one example, the optical fibers 26 are potted within the openings 24 by bonding the optical fibers using adhesive such as epoxy. Examples of the optical fibers 26 and the ferrule body 22 are shown and described with reference to FIGS. 1 and 2.

The operation 206 is performed to remove the fiber stubs and perform an initial polish to the distal end faces of the optical fibers 26 until they are even (e.g., flush) with the middle section 38. An example of this process can be seen in FIG. 3.

The operation 208 is performed to remove a layer of the middle section 38 of the ferrule 20 using a laser to create the fiber height or protrusion. Examples of this operation can be seen in FIGS. 9A-9C.

The operation 210 includes a final polish.

The operation 212 is performed to apply a laser to remove the edges 142 and material around guide-pin holes 46 adjacent to the middle section 38. Examples of this operation can be seen in FIG. 10A-10C.

Figure 17:
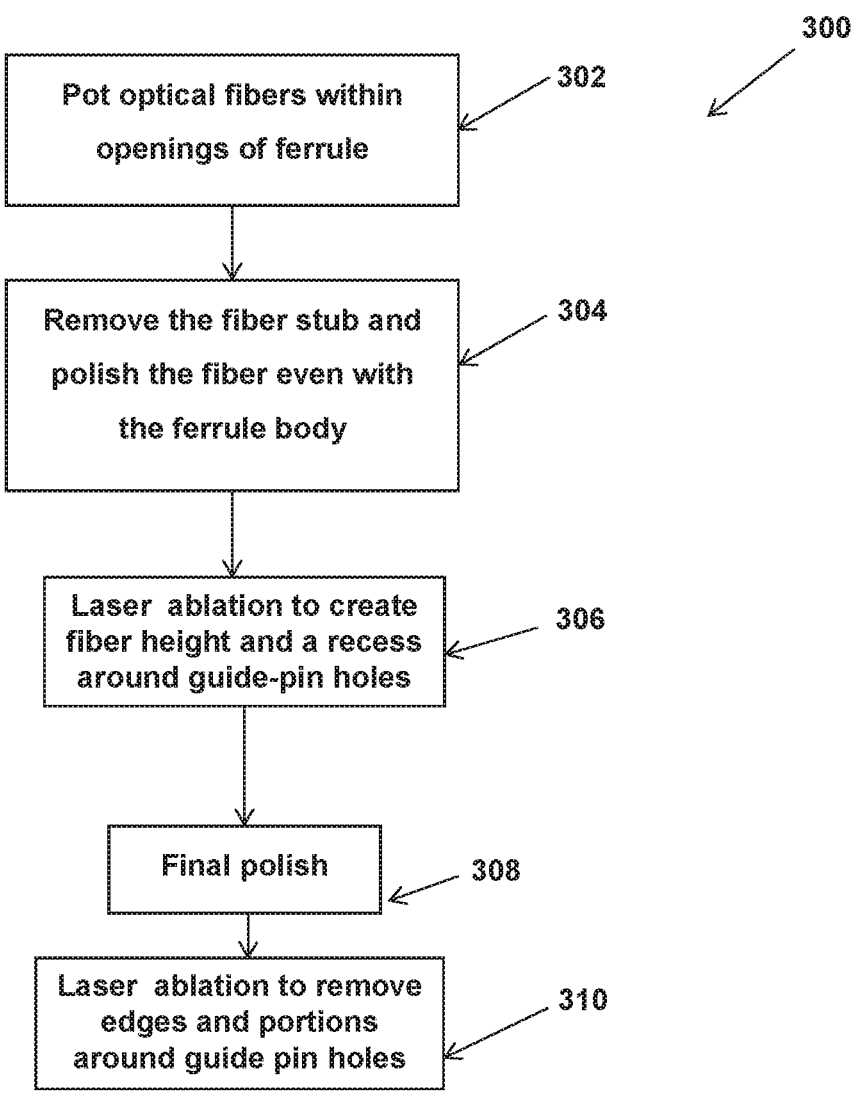
FIG. 17 is a flow chart illustrating yet another method for processing a multi-fiber ferrule in accordance with the principles of the present disclosure.

Referring to FIG. 17, a flow chart is illustrated showing an example method 300 for processing the multi-fiber ferrule 20. In this example, the method 300 includes operations, 302, 304, 306, 308, and 310.

Operation 302 is performed to pot the optical fibers 26 within the openings 24 of the pre-molded ferrule body 22. In one example, the optical fibers 26 are potted within the openings 24 by bonding the optical fibers using adhesive such as epoxy. Examples of the optical fibers 26 and the ferrule body 22 are shown and described with reference to FIGS. 1 and 2.

The operation 304 is performed to remove the fiber stubs and perform an initial polish to the distal end faces of the optical fibers 26 until they are even (e.g., flush) with the ferrule body 22. An example of this process can be seen in FIG. 3.

The operation 306 is performed to remove a layer of the ferrule 20 using a laser to create the fiber height or protrusion and to create the recess 44 around guide-pin holes 46. Examples of this operation can be seen in FIGS. 6A-6C.

The operation 308 includes a final polish.

The operation 310 is performed to apply a laser to remove the edges 142 and material around guide-pin holes 46 adjacent to the middle section 38. Examples of this operation can be seen in FIG. 7A-7C.

Figure 18:
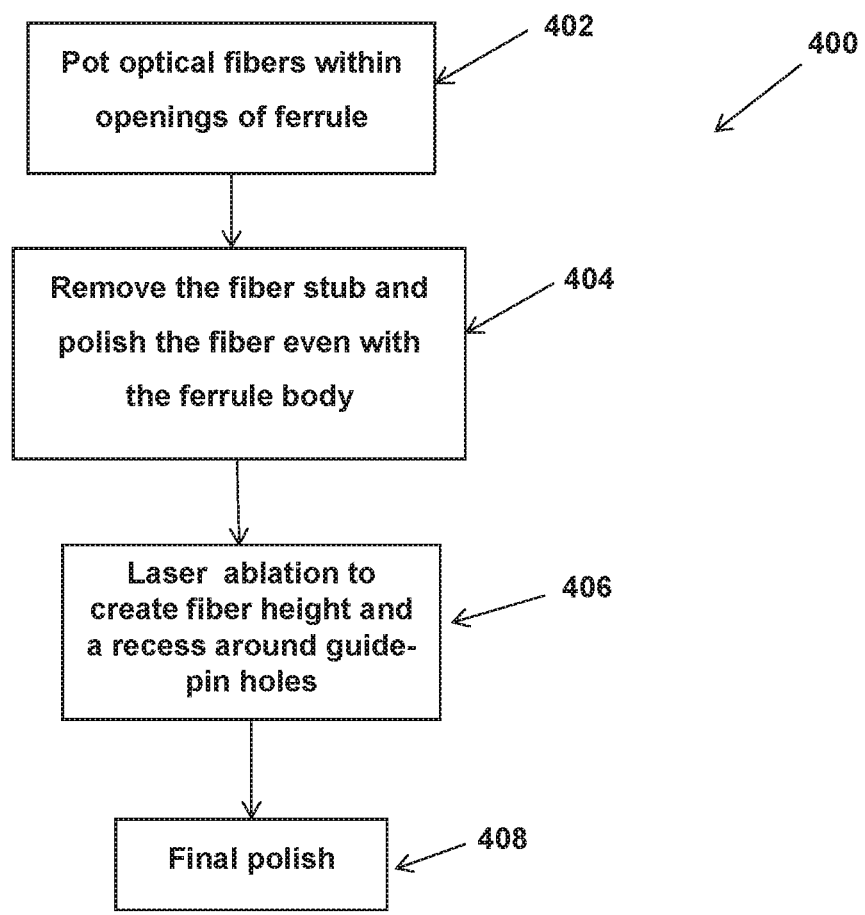
FIG. 18 is a flow charting illustrating another method for processing a multi-fiber ferrule in accordance with the principles of the present disclosure.

Referring to FIG. 18, a flow chart is illustrated showing an example method 400 for processing the multi-fiber ferrule 20. In this example, the method 400 includes operations, 402, 404, 406, and 408.

The operation 402 is performed to pot the optical fibers 26 within the openings 24 of the pre-molded ferrule body 22. In one example, the optical fibers 26 are potted within the openings 24 by bonding the optical fibers using adhesive such as epoxy. Examples of the optical fibers 26 and the ferrule body 22 are shown and described with reference to FIGS. 1 and 2.

The operation 404 is performed to remove the fiber stubs and perform an initial polish to the distal end faces of the optical fibers 26 until they are even (e.g., flush) with the middle section 38. An example of this process can be seen in FIG. 3.

The operation 406 is performed to remove a layer of the ferrule 20 using a laser to create the fiber height or protrusion and the recess 44 around guide-pin holes 46. Examples of this operation can be seen in FIGS. 12A-12C.

The operation 408 includes a final polish.

In other examples, the optical fibers can be laser cleaved after being potted in the ferrule body. Laser cleaving can be used to provide the end faces of the optical fibers with desired characteristics such as tilt angle and radius. After laser cleaving, another laser can be used to remove portions of the ferrule body to cause end portions of the optical fibers potted within the ferrule body to protrude distally outwardly from the distal end face of the ferrule body. The laser used to cleave the fibers typically generates a laser beam having a substantially different wavelength as compared to the laser beam used to remove the ferrule material from the end face of the ferrule.

In certain examples, the cleaving laser can be a $CO_2$ laser. By using this type of process, the number of polishing steps utilized can be reduced or eliminated. In certain examples, the optical fibers can protrude slightly beyond the end face of the ferrule after potting and laser cleaving and the face of the ferrule can subsequently be micro-machined using a pulse laser to increase the protrusion lengths of the optical fibers. In other examples, the optical fibers can be laser cleaved before potting, and then the fibers can subsequently be potted in the ferrule at a desired protrusion height (e.g., flush or with a positive protrusion height). Micro-machining using a pulse laser can therefore be used to increase the protrusion height if a protrusion height already exists, or to create a protrusion if the end faces of the fibers are initially flush with the ferrule end face.

In certain examples, pulsed fiber laser devices can be used to generate the laser beams for use in ablating the outer layers of the distal face of a ferrule without ablating the optical fibers. An example series of laser devices suitable for micro-machining ferrules in the manner described above include the G3 RM/HS series 10-20W pulsed fiber lasers which are sold by SPI Lasers UK Ltd, of South Hampton, UK.

As described above, the lasers used in ablating the distal surfaces of ferrules in accordance with the present disclosure preferably have laser beam characteristics selected to allow the laser beams to ablate the material of the ferrule body 22 without substantially ablating the optical fibers 26 potted within the ferrule body 22. Preferably, the laser beams are applied to the surface of the ferrule in a pulsed manner with an interaction time (i.e., a pulse length) that is less than $10^{-3}$ seconds, and a focal spot intensity (i.e., a power density) that is in the range of $10^3$ to $10^9$ watts per square centimeter. The number of pulses/interaction times per ablation location can be selected to remove a desired depth of material. By selecting the appropriate focal spot intensities and interaction times for the laser beam pulses, the depth the laser beams ablate into the surface of the ferrule with each pulse can be precisely controlled and layers of the ferrule beneath the desired depth are not compromised.

Additionally, in certain examples, the wavelengths of the laser beams are selected so as to be suitable for ablating the material of the ferrule without substantially ablating or damaging the material of the optical fibers (i.e., glass/silica). In certain examples, the wavelengths of the laser beam are in the range of 200 to 3000 nanometers (0.2 micrometers to 3.0 micrometers). In other examples, the wavelengths of the laser beam are less than 3000 nanometers. Preferably, the lasers have relatively high focal spot intensities (i.e., power densities in watts per cubic centimeter) and relatively short pulse lengths/durations (i.e., interaction times). In one example the focal spot intensity is at least $10^3$ watts per cubic centimeters, and the interaction time is less than $10^{-3}$ seconds. In other examples, the focal spot intensity is in the range of $10^3$ to $10^9$ watts per $cm^2$ and the interaction time is in the range of $10^{-12}$ to $10^{-3}$ seconds.

In certain examples, the laser beam pulse interaction locations/focal points can be moved (i.e., indexed, scanned) progressively across the distal end face 32 of the ferrule 20 such that upon completion of the micro-machining, substantially full coverage of the ferrule end face has been achieved. In this way, on average, a substantially uniform thickness of material is removed from the entire end face of the ferrule 20. It will be appreciated that at the submicron level an array of adjacent depressions/craters are formed in the end face of the ferrule. The movement of the focal points can be in a linear pattern, a criss-cross pattern or other patterns. The movement can also be random. Typically, the laser will be moved/indexed after a predetermined number of pulses have been applied to a given interaction location such that a predetermined depth of ferrule material is removed from the interaction location.

It will be appreciated that the ferrule body 22 can be made of various different materials. For example, in one example, the ferrule body can be manufactured from a thermoset material such as an epoxy that thermosets within a mold to form the desired shape of the ferrule body 22. In other examples, the ferrule body 22 can be made of a plastic material. For example, in one example, the ferrule body can be made via an injection molding process using a thermoplastic material such as polyphenylene sulfide (PPS). In certain examples, reinforcing members such as glass beads can be incorporated into the thermoplastic or thermoset material to reduce shrinkage.

While numerous characteristics of the laser beams have been described above, it will be appreciated that the characteristics of the laser beam used are dependent upon the material of the ferrule, material of the optical fibers, and the desired ablation rate. Hence, lasers having characteristics outside of the various ranges described herein are included within the scope of the present disclosure.

While the examples described above use a laser in the micro-machining process, it will be understood that other micro-machining techniques for removing/ablating the end material of a ferrule can be used as well. For example, micro-mechanical machining techniques using micro or nano-mechanical machining tools (e.g., micro or nano mechanical cutting tools, latches, etc.) can be used to remove portions of the ferrule end face to expose desired fiber protrusion lengths. Micro or nano robotics may be used to implement such micro-mechanical machining techniques. Also, micro-machining techniques can use etching techniques such as chemical or plasma etching. Other types of plasma based removal techniques can also be used. In other examples, ablation tools using electromagnetic wave-based energy streams (e.g., pulsed, continuous) can also be used.

During a continuous wave operation the laser continuously pumps and continuously emits light. The continuous wave operation can provide for a smoother energy stream which can be applied to the surface of the ferrule. The surface of the ferrule can be made smoother by the continuous energy streams. In other words, the continuous wave operation can provide for a uniform removal of material resulting in an equal distribution on the surface.

In other examples, the laser can operate to switch between the continuous wave operation and a pulsed operation. The pulsed operation can operate with varying parameters in different locations across the ferrule body 22 to achieve varying smoothness. The lasers used in ablating the distal surfaces of ferrules in accordance with the present disclosure preferably have laser beam characteristics selected to allow the laser beams to ablate the material of the ferrule body 22 without substantially ablating the optical fibers 26 potted within the ferrule body 22. In one example, the laser beam can have a pulse of less than about 10 nanoseconds to ablate material of the ferrule body 22 around the fibers 26 to achieve a smooth surface. In other examples, the pulse range can be between about 200 nanoseconds to about 500 nanoseconds to ablate material to the edges 42 of the ferrule 20 and around the guide-pin holes 46. At this pulse length, the surface may be less smooth than in other areas. Generally, if the laser has a shorter pulse length it results in a smoother surface. The power range may also vary with the pulse length. Thus, the pulse length can be varied based on the region taken into consideration and factors such as desired smoothness and removal rate. For regions that do not require precise smoothness, longer pulse rates or lengths can be used to increase removal speed. For regions requiring high levels of smoothness (e.g., around fibers), shorter pulse rates or lengths can be used.

The pulse operation step can be used in various stages of the micro-machining process. The pulse operation can be followed by a continuous operation to smooth out a given surface.

Referring to FIG. 19, an example overlap of a laser pulsed operation 500 is shown. In the laser pulsed operation, there may be overlap in a moving direction D of the laser based on a laser spot diameter and in a line direction (e.g., line to line). For example, in the moving direction D the spot overlap can be defined by a spot distance 502. For example, a spot size coverage area can be related to a scanning speed of the laser and frequency to achieve the spot distance 502. In one example, the spot size can be about 50 micrometers (μm) having an overlap spot distance 502 of about 6 micrometers (μm). It will be appreciated that the spot size may vary in other embodiments and in relation to the scanning speed. The scanning speed can vary between the ranges of about 200 to about 5000 micrometers per second (μm/s). It will be appreciated that the scanning speed range may also vary in other embodiments.

In one example, the overlap spot distance 502 can be about 90% for a laser with a 8 mm beam and 163 mm lens at a scanning speed of about 600 mm/s. In some examples, the parameters of the lens can vary to achieve a spot size overlap of at least about 50%. In other examples, the overlap spot distance 502 can be configured to be about 80%.

In the line direction, the line spacing can be defined by the distance between two laser lines in a hatch configuration. The distance between the two laser lines can be defined as the line-to-line width 504 (e.g., line-to-line overlap). In one example, the line-to-line width 504 can be about 20 micrometers which may result in an overlap of about 40%. In some examples, the line-to-line width 504 can vary to achieve an overlap of about 20%. In other examples, the line-to-line width 504 can vary to obtain an overlap of about 30%. It will be appreciated that the overlap may vary in other embodiments with respect to the line-to-line width 504.

From the forgoing detailed description, it will be evident that modifications and variations can be made without departing from the spirit and scope of the disclosure.

The invention claimed is:

1. A method for processing a multi-fiber ferrule for a multi-fiber fiber optic connector, the multi-fiber ferrule including a ferrule body defining a plurality of openings that extend therethrough, the ferrule body having a plurality of optical fibers potted within the plurality of openings, the method comprising:
removing a portion of a distal end face of the multi-fiber ferrule by moving a laser relative to the multi-fiber ferrule, wherein the laser moves in a linear moving direction along a plurality of parallel lines in which a plurality of laser beam pulses are directed at the distal end face of the multi-fiber ferrule;
wherein the laser defines a pulse spot on the distal end face of the multi-fiber ferrule each time the laser is pulsed, the pulse spot having a spot coverage area;
wherein spot coverage areas of adjacent pulse spots along a given one of the plurality of parallel lines overlap one another by at least 50 percent in the linear moving direction;
wherein adjacent ones of the plurality of parallel lines are spaced apart from one another by a distance less than a spot diameter of the adjacent pulse spots such that pulse spots of the adjacent parallel lines have spot coverage areas that overlap, the spot coverage areas of the adjacent parallel lines overlapping by at least 20 percent; and
wherein the percent of overlap in the linear moving direction of the spot coverage areas of adjacent pulse spots along one of the plurality of parallel lines is greater than the percent of overlap of the spot coverage areas of the adjacent parallel lines.

2. The method of claim 1, wherein the plurality of optical fibers protrude outwardly from the distal end face of the multi-fiber ferrule.

3. The method of claim 1, further comprising polishing the distal end face of the multi-fiber ferrule.

4. The method of claim 3, wherein after the removing step, projections are present at the distal end face to support the ferrule body during the subsequent polishing step.

5. The method of claim 4, wherein after the subsequent polishing step, the projections are removed by the laser.

6. The method of claim 3, wherein a flock film is used to polish the distal end face of the multi-fiber ferrule.

7. The method of claim 1, further comprising laser cleaving the plurality of optical fibers.

8. The method of claim 1, wherein the multi-fiber ferrule includes a pre-molded body having a raised region and a recessed region.

9. The method of claim 8, wherein the removing step includes exposing the raised region to the plurality of laser beam pulses to remove a layer of material such that the plurality of optical fibers protrude outwardly from the distal end face of the multi-fiber ferrule.

10. The method of claim 1, wherein the plurality of optical fibers are cleaved with a laser beam having a substantially different wavelength than corresponding wavelengths of the plurality of laser beam pulses used to remove the portion of the distal end face of the multi-fiber ferrule.

11. The method of claim 1, wherein the plurality of laser beam pulses have wavelengths in the range of 200-3000 nanometers.

12. The method of claim 11, wherein the plurality of laser beam pulses has focal spot intensities in the range of $10^3$ to $10^9$ watts per $cm^2$ and interaction times in the range of $10^{-12}$ to $10^{-3}$ seconds.

13. The method of claim 1, wherein the plurality of laser beam pulses ablates outer layers of the distal end face of the multi-fiber ferrule without ablating the plurality of optical fibers potted within the plurality of openings of the ferrule body.

14. The method of claim 1, wherein removal of the portion of the distal end face of the multi-fiber ferrule creates multiple recessed regions on the distal end face of the multi-fiber ferrule, the multiple recessed regions having varying depths.

15. A method for processing a multi-fiber ferrule for a multi-fiber fiber optic connector, the multi-fiber ferrule including a ferrule body defining a plurality of openings that extend therethrough, the ferrule body having a plurality of optical fibers potted within the plurality of openings, the method comprising:

polishing a distal end face of the ferrule; and removing a portion of the distal end face of the multi-fiber ferrule by using a laser process in which a laser is directed across the distal end face of the multi-fiber ferrule to ablate the portion of the distal end face;

wherein the step of removing the portion of the distal end face includes moving the laser across the distal end face of the multi-fiber ferrule at a first laser beam intensity to form a recessed region on the distal end face of the multi-fiber ferrule, and moving the laser across a central region on the distal end face of the multi-fiber ferrule at a second laser beam intensity to form the central region with a raised region relative to the recessed region, the plurality of optical fibers protruding outwardly from the central region such that the central region is recessed relative to the plurality of optical fibers;

wherein no portions of the distal end face of the multi-fiber ferrule are higher than the central region in which the plurality of optical fibers protrude;

wherein the laser moves in a linear moving direction along a plurality of parallel lines in which a plurality of laser beam pulses are directed at the distal end face of the multi-fiber ferrule;

wherein the laser defines a pulse spot on the distal end face of the multi-fiber ferrule each time the laser is pulsed, the pulse spot having a spot coverage area;

wherein spot coverage areas of adjacent pulse spots along a given one of the plurality of parallel lines overlap one another by at least 50 percent in the linear moving direction;

wherein adjacent ones of the plurality of parallel lines are spaced apart from one another by a distance less than a spot diameter of the adjacent pulse spots such that pulse spots of the adjacent parallel lines have spot coverage areas that overlap, the spot coverage areas of the adjacent parallel lines overlapping by at least 20 percent; and wherein the percent of overlap in the linear moving direction of the spot coverage areas of adjacent pulse spots along one of the plurality of parallel lines is greater than the percent of overlap of the spot coverage areas of the adjacent parallel lines.

16. The method of claim 15, wherein the first laser beam intensity is stronger than the second laser beam intensity.

17. The method of claim 15, wherein the first laser beam intensity removes a layer of thickness of about 25 to 30 microns.

18. The method of claim 15, wherein the second laser beam intensity removes a layer of thickness of about 5 to 10 microns.

19. The method of claim 15, further comprising guide-pin holes on opposing sides of the central region, the guide-pin holes being formed in the recessed region of the distal end face of the multi-fiber ferrule.

20. The method of claim 15, further comprising a step of polishing the distal end face of the multi-fiber ferrule after the laser process.

* * * * *